United States Patent [19]

Strasser et al.

[11] 4,397,596
[45] Aug. 9, 1983

[54] METHOD OF MAKING CONTAINER FOR GAS GENERATING PROPELLANT

[75] Inventors: Robert A. Strasser, Livonia; Stephen W. Goch, Northville, both of Mich.

[73] Assignee: Ford Motor Company, Dearborn, Mich.

[21] Appl. No.: 425,827

[22] Filed: Sep. 28, 1982

Related U.S. Application Data

[62] Division of Ser. No. 220,347, Dec. 29, 1980.

[51] Int. Cl.³ .............................................. B21D 51/26
[52] U.S. Cl. .......................................... 413/6; 413/8; 413/18; 413/73
[58] Field of Search ............... 413/1, 69, 2, 6, 72, 413/73, 75, 18, 8; 428/461, 483; 102/314, 370, 530, 531; 220/89 A, 89 B; 280/736, 737, 741

[56] References Cited

U.S. PATENT DOCUMENTS

| | | | |
|---|---|---|---|
| 2,535,624 | 12/1950 | Burney | 102/443 |
| 2,726,008 | 12/1955 | Atkinson | 413/69 |
| 2,995,088 | 8/1961 | Asplund | 102/530 |
| 3,523,513 | 8/1970 | Maier | 413/69 |
| 4,005,876 | 2/1977 | Jorgensen et al. | 102/531 |
| 4,158,696 | 6/1979 | Wilhelm | 102/531 |
| 4,358,998 | 11/1982 | Schneiter | 280/741 |

FOREIGN PATENT DOCUMENTS 2129358 12/1971 Fed. Rep. of Germany ...... 428/461

*Primary Examiner*—Leon Gilden
*Attorney, Agent, or Firm*—Daniel M. Stock; Clifford L. Sadler; John J. Roethel

[57] ABSTRACT

A container and a method for making the same for a gas generating propellant such as used in vehicle air bag systems. The container comprises an elongated thin wall metal cylinder having a plurality of perforations extending substantially the length thereof. A hermetic liner is attached to the inner surface of the cylinder to seal the perforated area of the wall. The hermetic liner comprises a laminated plastic film and metal foil composite having a thickness less than that of the cylinder wall and being rupturable under the pressure of gas generated within the cylinder. The ends of the cylinder are closed by metal end caps.

5 Claims, 6 Drawing Figures

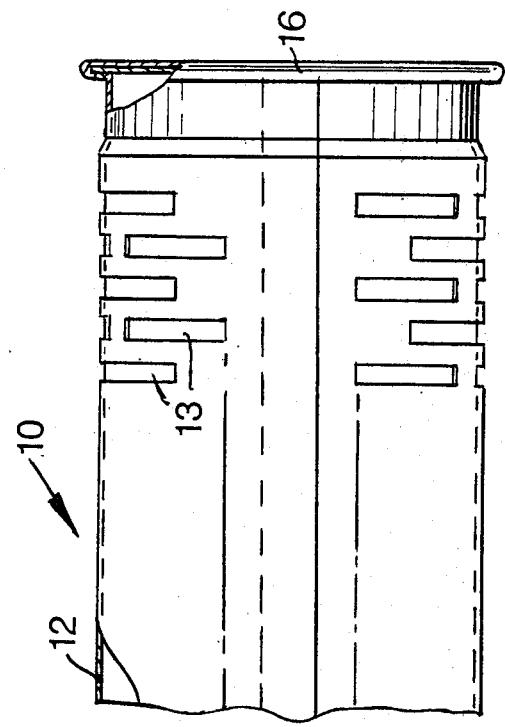
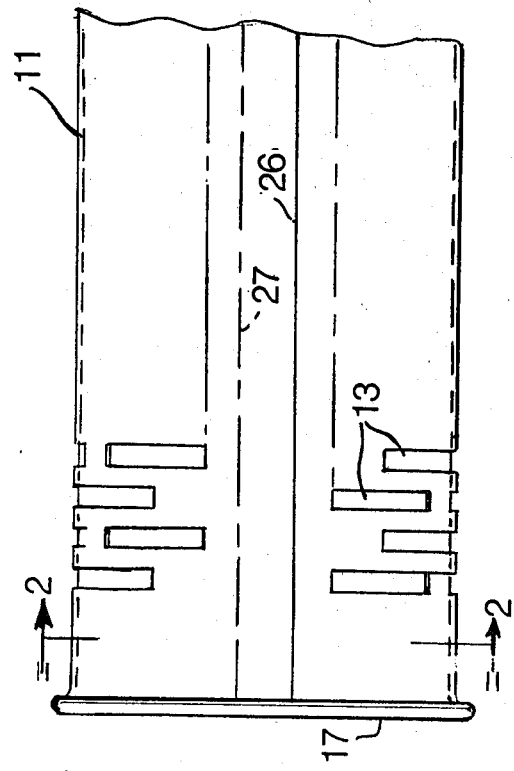
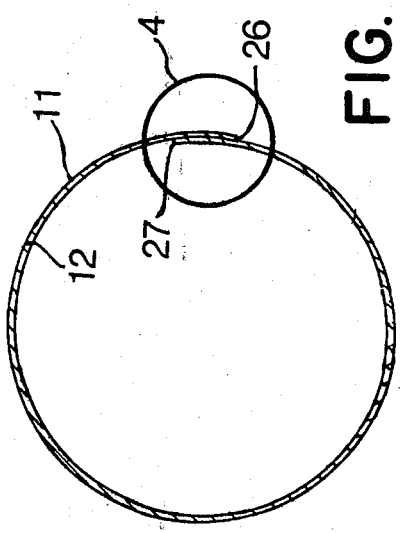
FIG. 1
FIG. 2

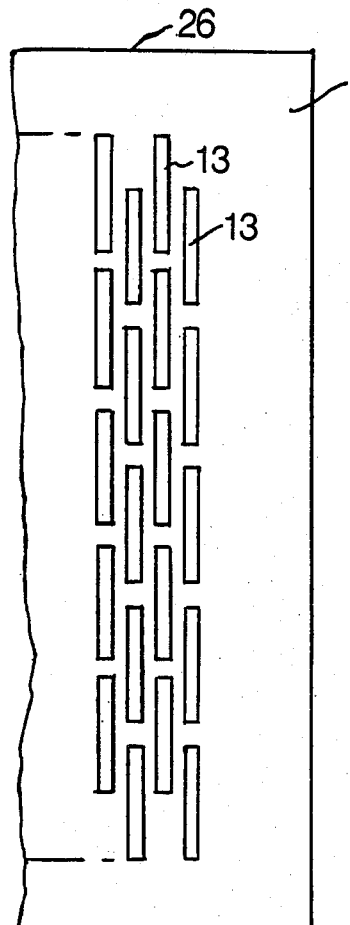
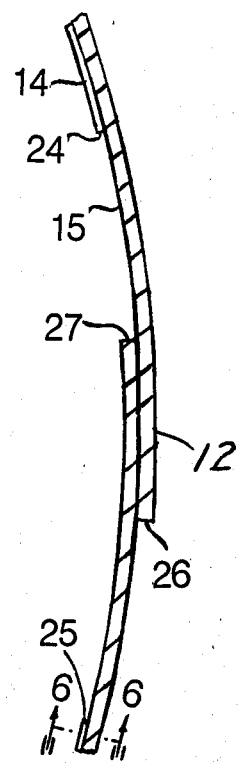
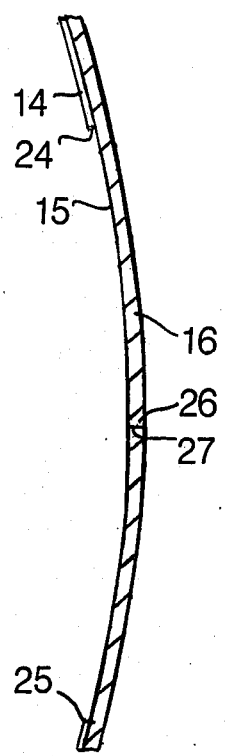
FIG. 3
FIG. 4
FIG. 5
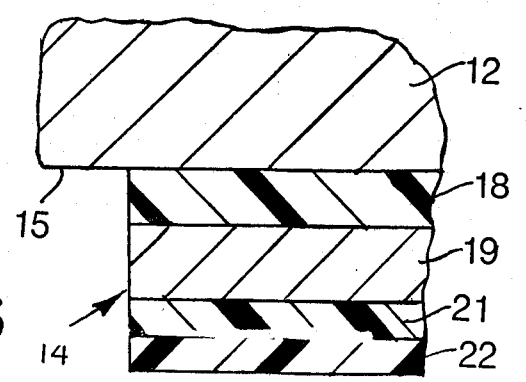
FIG. 6

METHOD OF MAKING CONTAINER FOR GAS GENERATING PROPELLANT

This is a division of application Ser. No. 220,347, filed Dec. 29, 1980.

PRIOR ART STATEMENT AND BACKGROUND OF THE INVENTION

The present invention relates to a propellant container or cannister for insertion into an inflator unit for a vehicle air bag system. Currently, many vehicle air bag systems utilize a propellant material in the form of explosive pellets of a gas producing composition. See U.S. Pat. No. 3,880,447 issued to W. F. Thorn on Apr. 29, 1975 for a "Crash Restraint Inflator for Steering Wheel Assembly" in which the pellets are described as comprising (but not limited to) a composition of 80% sodium azide and 20% potassium perchlorate. Since the pellets are of an explosive material, they must be manufactured in facilities geared to the handling of such materials, then packaged and shipped to the inflator assembly site.

It has been the practice to ship the pellets in a thin wall, impermeable bag made of readily rupturable material, the bag containing the pellets being contoured to be readily bodily insertable into the inflator chamber. It was found, however, that the bag was easily torn or snagged in handling and during insertion into the inflator chamber.

It is a purpose of the present invention to provide a readily manufacturable container for the propellant system, the construction of which will maximize the handling and sealing characteristics and minimize the incremental ballistic and toxicological effects to the air bag system.

SUMMARY OF THE INVENTION

The present invention relates to a container, and a method for manufacturing the same, for a gas generating propellant such as is used in vehicle air bag systems. The container comprises an elongated thin wall metal cylinder having a plurality of perforations extending substantially around the periphery of the cylinder and for substantially the full length of the latter. A hermetic liner is heat and pressure sealed to the inner surface of the cylinder to seal the perforated area of the cylinder wall. The hermetic liner comprises a laminated plastic film and metal foil composite having a thickness less than that of the cylinder wall and being readily rupturable under the pressure of gas generated in the cylinder upon the ignition of the propellant material. The ends of the cylinder are closed by metal end caps.

DESCRIPTION OF THE DRAWINGS

Other objects, advantages and features of the present invention will become more apparent as the description proceeds, reference being had to the accompanying drawings, wherein:

FIG. 1 is a side elevational view of a cylindrical container or cannister embodying the present invention;

FIG. 2 is a section view taken on the line 2—2 of FIG. 1;

FIG. 3 is a fragmentary view of a portion of a sheet metal blank, after it has been perforated, from which the cylinder wall is formed;

FIG. 4 is an enlarged view of the portion of FIG. 2 within the circle 4;

FIG. 5 is a view in part similar to FIG. 4 illustrating a second embodiment of the invention; and FIG. 6 is an enlarged view of the cross-section of the metal cylinder wall and plastic/foil laminate secured to the wall.

DETAILED DESCRIPTION OF THE INVENTION

Referring now to the drawings, FIGS. 1 and 2 illustrate the general configuration of the propellant container or cannister, generally designated 10, embodying the present invention. Basically, the container 10 comprises an elongated metal cylinder 11 having a thin wall 12. A portion of the wall 12 is provided with a plurality of perforations 13 extending substantially around the periphery of the cylinder for substantially the length of the latter. A hermetic liner 14 (see FIG. 6) is heat and pressure sealed to the inner surface 15 of the cylinder wall to seal its perforated area. The hermetic liner 14 comprises a plastic film and metal composite having a thickness less than the cylinder wall. The ends of the cylinder are closed by metal caps 16 and 17.

The end cap 17 may be of a special configuration to accommodate an ignition device or squib (not shown) for igniting gas generating pellets (not shown) adapted to be loaded into the container or cannister 10. A preferred embodiment of this end cap is disclosed in our copending U.S. application Ser. No. 220,478 filed Dec. 29, 1980, now U.S. Pat. No. 4,370,930 for an "End Cap for a Propellant Container."

In a preferred embodiment of the present invention, the container or cannister is approximately 500 millimeters long, has a diameter of approximately 45 millimeters and a wall thickness of 0.3+0.03 millimeters thick. The hermetic liner consists of a laminate of a first layer 18 of an ionomer resin film, the first layer being the layer in contact with inner surface 15 of the metal cylinder; a layer of aluminum foil 19, a second layer of ionomer resin film 21 and a layer of polyester film 22 covering the second layer of ionomer resin film 21 to isolate the latter from the propellant pellets. Prior to lamination, the thickness of the several layers is as follows:

| | |
|---|---|
| ionomer resin film layer 18 | 0.08 mm |
| aluminum foil layer 19 | 0.1 mm |
| ionomer resin film layer 21 | 0.05 mm |
| polyester film layer 22 | 0.048 mm |
| Total: | .278 mm |

The ionomer resin films are available from the E. I. duPont de Nemours & Co. under the trademark "Surlyn." The polyester film is also available from duPont under the trademark "Mylar."

It will be understood that the dimension specified were tailored to fit a specific air bag inflator for a vehicle air bag system. Accordingly, the specifications for other applications may vary.

The manufacture of the container or cannister 10 begins with a rectangular sheet metal blank designated 23 in FIG. 3, only a fragmentary portion of the sheet being shown. The sheet metal blank is perforated to provide the perforations 13 which comprise elongated rectangular slots arranged in parallel spaced rows with the longitudinal axes of the slots being transverse to the longitudinal axis of the cylinder 11. The slots 13 in each row are staggered relative to the slots in the adjacent rows to maximize the hoop strength of the cylinder formed from the sheet metal blank.

The open area of the slots 13 covers approximately 63% of the slotted area of the sheet metal blank. Substantial marginal areas are left unslotted at the ends and sides of the metal blank, as best seen in FIG. 3.

The hermetic liner 14 is positioned on the sheet metal blank 23 over the perforated area with the marginal unslotted portions of the blank left uncovered. The liner 14 is heat and pressure sealed to the inner surface 15 of the side of the metal blank that will become the inner surface of the container 10. As a result of the heat and pressure, the thickness of the hermetic liner 14 is substantially reduced and it has a final appearance of a thin tough skin on the metal surface.

After the hermetic liner 14 is in place on the sheet metal blank 23, the latter is rolled or formed into a tubular shape with the hermetic liner on the inner side of the tube. The rolling or forming continues until the marginal side edge portions are brought into overlapping relationship, as best seen in FIG. 4, or, in the alternative, in abutting relation, as best seen in FIG. 5. Depending on which alternative is selected, the joint is either lap welded or butt welded. Whichever alternative is chosen, the side edges 24–25 of the hermetic liner 14 are not overlapped by the weld seam, being spaced a substantial distance inwardly of the corresponding edges 26–27 of the sheet metal. The tube when completed is closed by the end caps 16 and 17.

The container or cannister is tested for leakage by being pressurized with helium. If the leakage does not exceed $1 \times 10^{-5}$ cc of helium per second, the container is acceptable.

When used in a vehicle air bag system, the ignition of the pellets contained in the container causes a rapid increase in internal pressure, causing the hermetic liner 14 to rupture at the slots 13 to permit air bag propellant to flow into the inflator unit.

It is to be understood this invention is not to be limited to the exact construction illustrated and described above, but that various changes and modifications may be made without departing from the spirit and scope of the invention as defined in the appended claims.

We claim:

1. The method of forming a propellant container, comprising:
    perforating a thin rectangular sheet metal blank throughout its length and width except for marginal portions at the sides and ends;
    positioning a hermetic liner over the perforated area of the sheet metal blank with the marginal portions of the latter being left substantially uncovered;
    sealing the hermetic liner to the underlying surface of the sheet metal blank;
    rolling the sheet metal blank into a tubular shape with the hermetic liner on the inner side of the tube;
    the sheet metal blank being rolled to bring its marginal side edge portions into contiguous relationship without overlapping the side edges of the hermetic liner;
    permanently joining the contiguous edges of the rolled sheet metal blank to form an integral elongated tube;
    and closing the open ends of the tube with end caps rolled and crimped to form a double seam.

2. The method forming a propellant container according to claim 1, in which:
    the hermetic liner is heat and pressure sealed.

3. The method of forming a propellant container according to claim 2, in which:
    the rolling of the sheet metal blank is terminated at the side marginal edges of the latter in overlapping relationship and permanently joined by welding.

4. The method of forming a propellant container according to claim 1, in which:
    the rolling of the sheet metal blank is terminated with perimeter edges of the marginal side edge portions in abutting relationship and permanently joined by butt welding.

5. The method of forming a propellant according to claim 1, in which:
    the container is leak tested by being internally pressurized with helium;
    the container being rejected if the helium leakage detectable exceeds $1 \times 10^{-5}$ cc of helium per second.

* * * * *